Patented May 20, 1952

2,597,750

UNITED STATES PATENT OFFICE 2,597,750

STABILIZED PHOSPHORUS AND SULFUR-CONTAINING HYDROCARBON REACTION PRODUCTS AND COMPOSITIONS CONTAINING THE SAME

Edward N. Roberts and Lawson W. Mixon, Hammond, Ind., assignors to Standard Oil Company, Chicago, Ill., a corporation of Indiana No Drawing. Application February 23, 1949, Serial No. 78,002

26 Claims. (Cl. 252—46.6)

The present invention relates to improved stabilized reaction products of a phosphorus sulfide and a hydrocarbon. More particularly, the invention is directed to sulfur and phosphorus containing lubricant additives stabilized against the evolution of hydrogen sulfide. The present invention is also directed to lubricant compositions containing such stabilized phosphorus and sulfur-containing additives.

It has heretofore been discovered that certain reaction products of a phosphorus sulfide and a hydrocarbon, particularly a hydrocarbon such as an olefin or an olefin polymer, when added to lubricants, such as a hydrocarbon oil, in small amounts, are effective in inhibiting the formation of varnish, sludge, carbon and the like, during use of such lubricants. The preparation of such reaction products are described in U. S. 2,316,082 granted to Clarence M. Loane and James W. Gaynor April 6, 1943, and in U. S. 2,422,585 issued to Thomas H. Rogers, Roger W. Watson, and James W. Starrett June 17, 1947. While these phosphorus sulfide-hydrocarbon reaction products are effective in inhibiting the formation of varnish, sludge, carbon and the like, it has been found that under certain conditions they evolve hydrogen sulfide in the course of their normal use or in storage. Because of the obnoxious odor of hydrogen sulfide gas, the use of such additives in lubricants is found objectionable by some users thereof.

It is an object of the present invention to provide a method of preparing phosphorus sulfide-hydrocarbon reaction products which are stabilized against the evolution of hydrogen sulfide during the course of their normal use or in storage. Another object of the present invention is to provide a stabilized phosphorus sulfide-hydrocarbon reaction product which will not evolve hydrogen sulfide during the course of its normal use or in storage. A still further object of the present invention is to provide a lubricant composition containing a reaction product of a phosphorus sulfide and a hydrocarbon, which lubricant composition will not evolve hydrogen sulfide during use or in storage. Other objects and advantages of the present invention will become apparent from the following description thereof.

In accordance with the present invention we have discovered that reaction products of a phosphorus sulfide and a hydrocarbon which will not evolve hydrogen sulfide during the course of its normal use or in storage can be obtained by reacting the resultant phosphorus sulfide-hydrocarbon reaction products with a quinone. The term "quinone" as used herein and in the appended claims, includes mono- and polynuclear quinones, such as benzoquinone, naphthoquinones, anthraquinones, phenanthraquinone, camphor-quinone and addition products and substituted derivatives thereof. The term "quinone" also includes isomers of such quinones. The quinones may contain substituent groups such as halogen, amino, alkyl, aryl, alkaryl, alkoxy, aroxyl, hydroxy and other substituent groups. The following specific compounds are representative of the classes named above:

para-bensoquinone
ortho-benzoquinone
2,6-dimethoxybenzoquinone
1,2-dimethyl-4,5-benzoquinone
toluquinone
xyloquinones
quinone haloids
monochloroquinone
dichloroquinones
methylanthraquinones
acenaphthene-quinone
phenanthraquinone
aminoquinone
diphenoquinone
methoxynaphthoquinones
1,4-naphthoquinone
1,2-naphthoquinone
2,6-naphthoquinone
camphor-quinone
amphi-chrysene-quinone
pyrene-quinone The phosphorus sulfide-hydrocarbon reaction product, which is reacted with a quinone as above described, can be readily obtained by reacting a phosphorus sulfide with a hydrocarbon at a temperature of from about 200° F. to about 600° F., and preferably from about 250° F. to about 500° F., using from about 1% to about 50%, and preferably from about 5% to about 25%, by weight, of the phosphorus sulfide in the reaction. It is advantageous to maintain a non-oxidizing atmosphere, such as for example, an atmosphere of nitrogen above the reaction mixture. Usually, it is preferable to use an amount of the phosphorus sulfide that will completely react with the hydrocarbon so that no further purification becomes necessary; however, an excess of phosphorus sulfide can be used and separated from the product by filtration or by dilution with a solvent, such as hexane, filtering and subsequently removing the solvent by suitable means, such as by distillation. The phosphorus sulfide-hydrocarbon reaction products contain sulfur and phosphorus. The reaction can be carried out in the presence of a sulfurizing agent or the phosphorus sulfide-hydrocarbon reaction product can be sulfurized, as described in U. S. 2,316,087 issued April 6, 1943 to James W. Gaynor and Clarence M. Loane.

The hydrocarbon constituent of this reaction is preferably a mono-olefin hydrocarbon polymer resulting from the polymerization of low molecular weight mono-olefinic hydrocarbons or isomono-olefinic hydrocarbons, such as propylene, butylenes, and amylenes or the copolymers obtained by the polymerization of hydrocarbon mixtures containing isomono-olefins and mono-olefins of less than six carbon atoms. The polymers may be obtained by the polymerization of these olefins or mixtures of olefins in the presence of a catalyst, such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and isomono-olefin polymers having molecular weights ranging from about 150 to about 50,000 or more, and preferably from about 500 to about 10,000. Such polymers can be obtained, for example, by the polymerization in the liquid phase of a hydrocarbon mixture containing mono-olefins and isomono-olefins such as butylene and isobutylene at a temperature of from about −80° F. to about 100° F. in the presence of a metal halide catalyst of the Friedel-Crafts types such as, for example, boron fluoride, aluminum chloride, and the like. In the preparation of these polymers we may employ, for example, a hydrocarbon mixture containing isobutylene, butylenes and butanes recovered from petroleum gases, especially those gases produced in the cracking of petroleum oils in the manufacture of gasoline.

A suitable polymer for the reaction with phosphorus sulfide is the product obtained by polymerizing in the liquid phase a hydrocarbon mixture containing butylenes and isobutylenes together with butanes and some $C_3$ and $C_5$ hydrocarbons at a temperature between about 0° F. and 30° F. in the presence of aluminum chloride. A suitable method for carrying out the polymerization is to introduce the hydrocarbon mixture cooled to a temperature of about 0° F. into the bottom of the reactor, passing it upwardly through the catalyst layer while regulating the temperature within the reactor so that the polymer product leaving the top of the reactor is at a temperature of about 30° F. After separating the polymer from the catalyst sludge and unreacted hydrocarbons, the polymer is fractionated to obtain a fraction of the desired viscosity such as, for example, from about 80 to about 2000 S. S. U. at 210° F.

Another suitable polymer is that obtained by polymerizing, in the liquid phase, a hydrocarbon mixture comprising substantially $C_3$ hydrocarbons in the presence of an aluminum chloride complex catalyst. The catalyst is preferably prepared by heating aluminum chloride with isooctane. The temperature in the reactor is controlled within the range of about 50° F. to about 110° F. The hydrocarbon mixture is introduced into the bottom of the reactor and passed upwardly through the catalyst layer. The propane and other saturated gases pass through the catalyst while the propylene is polymerized under these conditions. The molecular weight of the propylene polymer is about 500 to about 1000.

Other suitable polymers can be obtained by polymerizing a hydrocarbon mixture containing about 10% to about 25% isobutylene at a temperature of from about 0° F. to about 100° F., and preferably 0° F. to about 32° F. in the presence of boron fluoride. After the polymerization of the isobutylene together with a relatively minor amount of the normal olefins present, the reaction mass is neutralized, washed free of acidic substances and the unreacted hydrocarbons subsequently separated from the polymers by distillation. The polymer mixture so obtained, depending upon the temperature of reaction, varies in consistency from a light liquid to a viscous, oily material and contains polymers having molecular weights ranging from about 100 to about 2000 or higher. The polymers so obtained may be used as such or the polymers may be fractionated under reduced pressure into fractions of increasing molecular weights, and suitable fractions obtained reacted with the phosphorus sulfide to obtain the desired reaction products. The bottoms resulting from the fractionation of the polymer which may have S. S. U. viscosities at 210° F., ranging from about 50 seconds to about 10,000 seconds, are well suited for the purpose of the present invention.

Another source of an olefinic polymer suitable for the herein intended purpose is a fraction of the polymer obtained as an intermediate in the synthesis of isooctane. In this synthesis a gaseous hydrocarbon mixture containing isobutylene and normal butylenes is polymerized in the presence of a phosphoric acid catalyst. Such a polymer may be obtained by subjecting a gas mixture comprising hydrocarbons having less than six carbon atoms, that is, predominantly $C_4$ olefins and paraffins to temperatures of about 270° F. to about 430° F., and preferably at about 300° F. to about 330° F. at pressures of from about 500 pounds per square inch to 750 pounds per square inch in the presence of a catalyst such as phosphoric acid. The mixed polymer obtained comprises essentially a dimer but contains in addition about 5–10% of heavy polymers comprising trimers, tetramers and still higher polymers. This heavy polymer fraction may be fractionated to give about 10–15% bottoms which comprises essentially a tetramer fraction bottom boiling within the range of from about 400° F. to about 520° F.

Essentially paraffinic hydrocarbons such as bright stock residuums, lubricating oil distillates, petrolatums or paraffin waxes may be used. The condensation products of any of the foregoing hydrocarbons or their halogen derivatives, with aromatic hydrocarbons can also be employed.

Examples of high molecular weight olefinic hydrocarbons which can be employed as reactants are cetene ($C_{16}$), cerotene ($C_{26}$), melene ($C_{30}$), and mixed high molecular weight alkenes obtained by cracking petroleum oils.

Other preferred olefins suitable for the preparation of the herein described phosphorus sulfide reaction products are olefins having at least 20 carbon atoms in the molecule of which from about 12 carbon atoms to about 18 carbon atoms, and preferably at least 15 carbon atoms, are in a long chain. Such olefins can be obtained by the dehydrogenation of paraffins, such as by the cracking of paraffin waxes, or by the dehalogenation of alkyl halides, preferably long chain alkyl halides, particularly halogenated paraffin waxes.

The olefins obtained by dehalogenation of long chain alkyl halides are preferably those obtained by dehalogenation of monohalogenated waxes, such as for example, those obtained by dechlorination of monochlorparaffin wax. The alkyl halides are decomposed to yield olefins according to the reaction $$C_nH_{2n+1}X \rightarrow C_nH_{2n} + HX$$

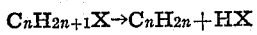

in which $n$ is a whole number, preferably 20 or more, and X is a halogen. It is preferred to employ paraffin waxes having at least about 20 carbon atoms per molecule and melting points upwards from about 90° F. to about 140° F.

To obtain the halogenated paraffin wax, for example, chlorinated paraffin wax, chlorine is introduced into the wax, maintained in a molten state, until the wax has a chlorine content of from about 8% to about 15%. The chlorinated wax product is a mixture of unchlorinated wax, monochlor wax and polychlor wax. This chlorinated product may be used as such but it is advantageous to use the substantially monochlor wax fraction. The monochlor wax fraction can be segregated from the unchlorinated wax and the polychlor wax fractions by taking advantage of the differences in the melting points of the various fractions, since the melting point of the wax varies with the extent of chlorination, i. e. the melting point of the unchlorinated wax is greater than that of the monochlor wax, and the melting point of the latter is greater than that of the polychlor wax. Thus, the monochlor paraffin wax can be separated from the unchlorinated and the polychlor wax fractions by means such as sweating, fractional distillation, solvent extraction, solvent precipitation and fractional crystallization.

The high molecular weight olefins are obtained by removing the halogen as hydrogen halide from the halogenated paraffin wax. For example, the corresponding olefin is obtained from the monochlor paraffin wax by removing the chlorine from the latter as hydrogen chloride. The monochlor wax can be dechlorinated by heating to a temperature of from about 200° F. to about 600° F. in the presence of a dechlorinating agent such as an alkali metal hydroxide or an alkaline earth metal hydroxide or oxide. Other alkaline inorganic or organic materials can also be used. The chlorine can also be removed from the chlorowax by heating the same for a prolonged period in the absence of any dechlorinating agent. After the dehalogenation has been completed the olefin so obtained can be further purified by removing the dehalogenating agent by means of filtration or other suitable means.

As a starting material there can be used the polymer or synthetic lubricating oil obtained by polymerizing unsaturated hydrocarbons resulting from the vapor phase cracking of paraffin waxes in the presence of aluminum chloride which is fully described in United States Patents Nos. 1,995,260, 1,970,002 and 2,091,398. Still another type of olefin polymer which may be employed is the polymer resulting from the treatment of vapor phase cracked gasoline and/or gasoline fractions with sulfuric acid or solid absorbents such as fuller's earth whereby unsaturated polymerized hydrocarbons are removed. Also contemplated within the scope of this invention is the treatment with a phosphorus sulfide of the polymers resulting from the voltolization of hydrocarbons as described, for example, in United States Patents Nos. 2,197,768 and 2,191,787.

Also contemplated within the scope of the present invention are the reaction products of a phosphorus sulfide with an alklyated aromatic hydrocarbon such as, for example, an alkyl benzene characterized by having at least one alkyl group of at least four carbon atoms, and preferably at least eight carbon atoms such as a long chain paraffin wax.

The phosphorus sulfide reactant can be any phosphorus sulfide, such as for example $P_2S_3$, $P_4S_3$, $P_4S_7$, and preferably $P_2S_5$.

If desired, handling of the phosphorus sulfide-hydrocarbon reaction product can be facilitated by the addition thereto of a relatively low viscosity hydrocarbon oil. In carrying out the reaction of the phosphorus sulfide-hydrocarbon reaction product with the quinone, a mixture of the phosphorus sulfide-hydrocarbon reaction product with from about .5% to about 40% by weight, and preferably from about 2% to about 20% by weight, of the quinone is heated at a temperature of from about 100° F. to about 400° F., and preferably from about 200° F. to about 250° F. for a period of about 10 minutes to about 5 hours, and preferably from about 15 minutes to about 2 hours. The reaction may be carried out in an inert atmosphere, such as by blowing with an inert gas. Completion of the reaction is indicated by the absence of hydrogen sulfide evolution when the product is heated at temperatures up to 200° F. and by the absence of the odor of quinone.

The reaction product of the phosphorus sulfide and hydrocarbon can be reacted with the quinone as such or, if desired, the phosphorus sulfide-hydrocarbon reaction product may be further reacted with basic oxides or hydroxides to form the salts thereof. As an alternative the product obtained by reacting a quinone with the reaction product of a phosphorus sulfide and a hydrocarbon can be neutralized to form the salt thereof. To form the salts, the reaction products can suitably be treated with a basic compound such as a hydroxide, carbonate, oxide, or sulfide of an alkaline earth metal, or an alkali metal such as, for example, potassium hydroxide, sodium hydroxide, sodium sulfide, calcium hydroxide, calcium oxide, sodium carbonate, etc. The basic reagent may be used in the form of an aqueous solution thereof or in an alcoholic solution. As an alternative method the reaction product can be treated with solid alkaline compounds, such as potassium hydroxide, sodium hydroxide, sodium carbonate, potassium bicarbonate, potassium carbonate, calcium oxide, magnesium oxide, and the like at elevated temperatures of from 200° F. to about 600° F. Neutralized products containing heavy metal constituents, such as for example, tin, titanium, aluminum, chromium, cobalt, zinc, iron, and the like, can also be obtained by reacting a salt of the desired heavy metal with the alkali metal or alkaline earth salt of the reaction product.

The preparation of the stabilized products of the present invention is illustrated by the following examples, which are given solely by way of illustration and are not to be construed as limiting the scope of the invention.

EXAMPLE I

A polymer obtained by treating a hydrocarbon mixture containing about 10 to 25% isobutylene with boron fluoride at a temperature of about 32° F. and distilled to a bottoms having a Saybolt Universal viscosity of about 3000 seconds at 210° F. is reacted with about 10% $P_2S_5$ at a temperature of 370° F. to 390° F. for about five hours and blown with nitrogen for an additional five hours within the same temperature range. The resultant reaction product can be stabilized against the evolution of hydrogen sulfide by reacting about 90 parts of the reaction mixture with about 10 parts benzoquinone at a temperature of 200° to 250° F. for about two to five hours.

EXAMPLE II

A long chain olefinic hydrocarbon obtained by the dehydrochlorination of a chlorinated paraffin wax of about 130° to 132° F. melting point is reacted with about 10% $P_2S_5$ at a temperature of 300° F. to 400° F. for four hours. The resultant reaction product is then stabilized against the evolution of hydrogen sulfide by diluting with a mineral oil of about 10 SAE motor oil grade to give a 50% solution, and the oil solution of the reaction product reacted with about 5% of benzoquinone based on the total weight of the solution at a temperature of 200° to 250° F. for two to five hours.

EXAMPLE III

A mineral lubricating oil fraction derived from a so-called Winkler crude oil and having a gravity of 25.6 API, a Saybolt Universal viscosity at 100° F. of 285 to 300 seconds and a pour point of about 5° F., was mixed with 9% $P_2S_5$ at a temperature of 100 to 400° F. for about three hours and maintained at the maximum temperature for an additional hour. The resultant reaction product can be stabilized by reacting about 90 parts by weight thereof with about 10 parts by weight benzoquinone at a temperature of 200 to 250° F. for about two to five hours.

EXAMPLE IV

A cracked cyclic stock having a Saybolt Universal viscosity at 100° F. of 53 seconds, a gravity of 23.2 API, an initial boiling point of 408° F. and a 90% distillation point of 734° F. is reacted with 9% $P_2S_5$ at a temperature of 300 to 400° F. The resultant reaction product is stabilized by forming a 50% solution thereof with a low viscosity mineral oil and reacting with about 10 to 15% benzoquinone at a temperature of 200 to 250° F. for two to five hours.

EXAMPLE V

A fraction of polymer obtained by polymerizing the olefins from a refinery butane-butene stream and having a Saybolt Universal viscosity at 210° F. of about 1000 seconds and a molecular weight of about 900, is reacted with 17.5% $P_2S_5$ and 2.3% sulfur at 400° F. for 6 hours. The resultant reaction product is then reacted with 10% benzoquinone at 250° F. for thirty minutes. During the entire time of the reactions and for two hours afterward the mixture is blown with refinery "inert" gas.

EXAMPLE VI

A fraction of polymer obtained by polymerizing the olefins from a refinery butane-butene stream and having a Saybolt Universal viscosity at 210° F. of about 1000 seconds and a molecular weight of about 900, is reacted with 17.5% $P_2S_5$ and 2.3% sulfur at 400° F. for six hours. Following this, 8.2% KOH (in 50% aqueous solution) is added to the mixture at 400° F. during a period of four hours. The mixture is then steamed four hours with 400° F. steam. The resultant reaction product is then reacted with 10% benzoquinone at 250° F. for thirty minutes. During the entire time of the reactions and for two hours afterward, the mixture is blown with refinery "inert" gas.

EXAMPLE VII

A fraction of polymer obtained by polymerizing the olefins from a refinery butane-butene stream and having a Saybolt Universal viscosity at 210° F. of about 1000 seconds and molecular weight of about 900, is reacted with 17.5% $P_2S_5$ and 2.3% sulfur at 400° F. for six hours. Following this 8% $Na_2S$ (60% flakes) is added to the mixture at 400° F. during a period of four hours. The resultant reaction product is then reacted with 10% benzoquinone at 250° F. for thirty minutes. During the entire time of the reaction and for two hours afterward the mixture is blown with refinery "inert" gas.

The products prepared in accordance with the present invention are useful as additives for normally liquid and/or solid petroleum products such as lubricating oils, fuel oils, insulating oils, turbine oils, waxes, residual oils and asphalts, synthetic oils useful as lubricants, such as for example, olefin polymers, esters of polycarboxylic acids and/or the polymers thereof, monohydroxypolyoxy alkylene monoethers, such as monohydroxy, 1,2-polyoxypropylene monoethers, greases containing natural or synthetic lubricating oil bases, non-drying animal, vegetable and marine oils. The products are also useful as rubber vulcanization accelerators, ore flotation agents, etc.

When used as additives for natural or synthetic lubricating oils, such as hydrocarbon oils, the herein described reaction products are suitably employed in amounts within the range of from about 0.001% to about 10%, preferably from about 0.01% to about 3% by weight. These additives can be used in such lubricating oils alone, or in combination with other additives, such as well known pour point depressors, extreme pressure agents, antioxidants, and particularly with elemental sulfur or organic sulfur compounds in amounts of from about 0.001% to about 5%. Examples of suitable sulfurized organic compounds are sulfurized mineral oils, sulfurized animal oils, sulfurized vegetable oils, sulfurized fish oils, sulfurized terpenes, sulfurized sperm oils, sulfurized olefin polymers, such as sulfurized propene or butene polymers, and the like.

The effectiveness of the herein described reaction products of the present invention in inhibiting the evolution of hydrogen sulfide is demonstrated by the data in Table I. These data were obtained by the following test: Twelve and one-half grams of the product to be tested, diluted with an equal amount of an S. A. E. 10 grade base oil, is placed in a closed glass tube of about 50 milliliter capacity, provided with a bottom gas inlet and a top gas outlet. Nitrogen is bubbled through the liquid at 200° F. and into 20 cc. of a water solution containing 5 cc. of a 0.2% lead acetate solution. Hydrogen sulfide evolution may be rated by the color density of the lead acetate solution after a given time or by the time required to exhaust the lead acetate solution as indicated by the color of a small auxiliary tube of lead acetate solution.

TABLE I

*Hydrogen sulfide evolution test*

| Sample | Time in Minutes required to exhaust Lead Acetate Solution |
|---|---|
| 1. Reaction product of 15% $P_2S_5$ with butylene polymer of about 1000 molecular weight | 5 |
| 2. No. 1 reacted with 10% benzoquinone | 570 |
| 3. No. 1 reacted with 12% benzoquinone | 720 |
| 4. No. 1 neutralized with sodium sulfide and then reacted with 10% benzoquinone | 1,440 |

The quinone reaction products of the present invention are not only effective in inhibiting the evolution of hydrogen sulfide but are also effective in inhibiting or preventing the oxidation of hydrocarbon oils in the absence or presence of oxidation catalysts, such as copper and/or lead. This property is demonstrated by the data in Table II. These data were obtained by subjecting various samples as described below to a Dornte type oxygen absorption test run at 300° F., described in Industrial and Engineering Chemistry, January 1936, page 26.

Oil I—Control oil (SAE 20 motor base oil)
Oil II—Control oil containing 0.75% of the product obtained by reacting 18% $P_2S_5$ and 85% of an isobutylene polymer of about 1000 molecular weight, and reacting 90 parts of the resultant product with 10 parts quinone at about 200° F. to 250° F.

TABLE II

| Oil | Catalyst | Hours to Absorb 2000 cc. $O_2$ per 100 grams of Oil |
|---|---|---|
| 1 | 1 cm.³ lead per gram of oil | 75 |
| 2 | do | 164 |
| 1 | 0.5 cm.³ copper per gram of oil | 5 |
| 2 | do | 84 |
| 1 | 0.24 cm.³ CuPb bearing alloy per gram of oil | 17 |
| 2 | do | 96 |

The effectiveness of the quinone reaction product of the present invention in inhibiting varnish, sludge and/or carbon deposits in internal combustion engines was demonstrated by subjecting a solvent extracted MC SAE 30 grade motor oil containing 0.75% of the product obtained by reacting 10 parts of benzoquinone with the reaction product of 15% $P_2S_5$ and 85% of an isobutylene polymer of about 1000 molecular weight to the Standard L-4 Chevrolet Test, in which a six cylinder spark-ignition internal combustion engine equipped with two copper-lead alloy bearings is operated about 3000 R. P. M. with an oil temperature of about 280° F. for thirty-six hours. At the conclusion of this test the engine was found to be substantially free of sludge and varnish as shown by a piston varnish rating of 9.7 (10.0 being perfect), and with an average copper-lead bearing weight loss of 0.067 gm. per whole bearing.

Unless otherwise indicated the percentages given herein and in the appended claims are weight percentages.

The present application is a continuation-in-part of our copending application Serial No. 673,632, filed May 31, 1946 which issued as U. S. Patent No. 2,497,097 February 14, 1950.

While we have described our invention by references to specific embodiments thereof, the invention is not to be limited thereto but includes within its scope such modifications as come within the spirit of the appended claims.

We claim:

1. A new composition of matter, the product obtained by reacting from about 1% to about 50% of a phosphorus sulfide with a normally liquid hydrocarbon at a temperature within the range of from about 200° F. to about 600° F., and subsequently reacting the resultant reaction product with from about 0.5% to about 40% of a quinone at temperature within the range of from about 100° F. to about 400° F.

2. A new composition of matter as described in claim 1, in which the hydrocarbon is an olefinic hydrocarbon.

3. A new composition of matter as described in claim 1, in which the hydrocarbon is a polymer of an olefin of less than six carbon atoms.

4. A new composition of matter as described in claim 1, in which the hydrocarbon is a butylene polymer.

5. A new composition of matter as described in claim 1, in which the hydrocarbon is a propylene polymer.

6. A new composition of matter as described in claim 1, in which the phosphorus sulfide is phosphorus pentasulfide.

7. A new composition of matter as described in claim 1, in which the quinone is a benzoquinone.

8. A new composition of matter as described in claim 1, in which the quinone is a naphthoquinone.

9. A new composition of matter as described in claim 1, in which the quinone is an anthraquinone.

10. A new composition of matter, the product obtained by reacting from about 1% to about 50% of a phosphorus sulfide with a normally liquid hydrocarbon at a temperature within the range of from about 200° F. to about 600° F., reacting the resultant product with from about 0.5% to about 40% of a quinone at a temperature within the range of from about 100° F. to about 400° F., and neutralizing the quinone reaction product with a basically reacting metallic compound.

11. A lubricant composition containing a major proportion of an oil and from about 0.001% to about 10% of the product obtained by reacting from about 1% to about 50% of a phosphorus sulfide with a normally liquid hydrocarbon at a temperature within the range of from about 200° F. to about 600° F., and reacting the resultant reaction product with from about 0.5% to about 40% of a quinone at a temperature within the range of from about 100° F. to about 400° F.

12. A lubricant composition as described in claim 11, in which the hydrocarbon is a polymer of an olefin hydrocarbon having not more than six carbon atoms.

13. A lubricant composition as described in claim 11, in which the olefin polymer is a butylene polymer.

14. A lubricant composition as described in claim 11, in which the olefin polymer is a propylene polymer.

15. A composition of matter comprising a major proportion of a normally non-gaseous petroleum fraction and from about 0.01% to about 10% of the product obtained by reacting from about 1% to about 50% of a phosphorus sulfide with an olefin polymer at a temperature of from about 200° F. to about 600° F., and reacting the resultant reaction product with from about 0.5% to about 40% of a quinone at a temperature of from about 100° F. to about 400° F.

16. A lubricant composition containing a major proportion of an oil and from about 0.001% to about 10% of a metal salt of the product obtained by reacting from about 1% to about 50% of a phosphorus sulfide with a normally liquid hydrocarbon at a temperature within the range of from about 200° F. to about 600° F. and reacting said reaction product with from about 0.5% to about 40% of a quinone at a temperature within the range of from about 100° F. to about 400° F.

17. A composition of matter comprising a major proportion of an oil and from about 0.001% to about 10% of a metal salt of the product obtained by reacting from about 1% to about 50% of a phosphorus sulfide with an olefin polymer at a temperature of from about 200° F. to about 600° F., and reacting said reaction product with from about 0.5% to about 40% of a quinone at a temperature of from about 100° F. to about 400° F., and neutralizing said reaction product with a basically reacting metallic reagent.

18. A composition as described in claim 17, in which the basic reagent is a base of an alkali metal.

19. A composition as described in claim 17 in which the basic reagent is sodium hydroxide.

20. A composition as described in claim 17 in which the basic reagent is potassium hydroxide.

21. A composition as described in claim 17 in which the basic reagent is a base of an alkaline earth metal.

22. A composition as described in claim 17 in which the basic reagent is a basic calcium compound.

23. A composition as described in claim 17 in which the basic reagent is an alkali metal sulfide.

24. A composition as described in claim 17, in which the phosphorus sulfide is phosphorus pentasulfide.

25. A lubricant composition containing a major proportion of an oil and from about 0.001% to about 10% of a metal salt of the product obtained by reacting from about 1% to about 50% of a phosphorus sulfide with a normally liquid hydrocarbon at a temperature of from about 200° F. to about 600° F., neutralizing said reaction product with a basically reacting metallic compound and reacting the neutralized product with from about 0.5% to about 40% of a quinone at a temperature within the range of from about 100° F. to about 400° F.

26. A composition of matter as described in claim 25 in which the normally liquid hydrocarbon is an olefinic hydrocarbon having a molecular weight of at least about 150.

EDWARD N. ROBERTS.
LAWSON W. MIXON.

REFERENCES CITED

The following references are of record in the file of this patent:

UNITED STATES PATENTS

| Number | Name | Date |
| --- | --- | --- |
| 1,926,648 | Powers | Sept. 12, 1943 |
| 2,461,961 | Buckmann et al. | Feb. 15, 1949 |
| 2,463,429 | Roberts | Mar. 1, 1949 |
| 2,497,097 | Roberts et al. | Feb. 14, 1950 |